United States Patent [19]

Chang

[11] Patent Number: 5,157,865
[45] Date of Patent: Oct. 27, 1992

[54] CANTILEVER TYPE MOSQUITO CATCHER

[76] Inventor: Che-Yuan Chang, c/o Hung Hsing Patent Service Center, P.O. Box 55-1670, Taipei (10477), Taiwan

[21] Appl. No.: 771,130

[22] Filed: Oct. 3, 1991

[51] Int. Cl.$^5$ ............................................. A01M 1/08
[52] U.S. Cl. ........................................................ 43/113
[58] Field of Search ................................... 43/113, 139

[56] References Cited

U.S. PATENT DOCUMENTS

| | | | |
|---|---|---|---|
| D. 189,782 | 2/1961 | Richardson | 43/139 |
| 1,753,585 | 4/1930 | Umstead | 43/113 |
| 2,931,127 | 4/1960 | Mayo | 43/113 |
| 3,041,773 | 7/1962 | Gagliano | 43/113 |
| 3,305,965 | 2/1967 | Cornell, III | 43/113 |
| 4,141,173 | 2/1976 | Weimert et al. | 43/113 |
| 4,282,673 | 8/1981 | Focks et al. | 43/113 |
| 4,856,226 | 8/1989 | Taylor | 43/113 |
| 5,014,460 | 5/1991 | Patti et al. | 43/113 |
| 5,020,270 | 6/1991 | Lo | 43/113 |

FOREIGN PATENT DOCUMENTS

| | | | |
|---|---|---|---|
| 1429692 | 1/1966 | France | 43/139 |
| 358817 | 5/1938 | Italy | 43/113 |
| 1119478 | 7/1968 | United Kingdom | 43/139 |

Primary Examiner—Richard K. Seidel
Assistant Examiner—Jeanne M. Elpel

[57] ABSTRACT

A mosquito catcher includes at least a fluorescent lamp installed on a cantilever secured above a fan, a mosquito-attracting agent placed on the catcher for luring the mosquito flying to the lamp so as to suck the mosquitoes by the fan impeller into a cone-shaped net secured under the fan impeller for killing the mosquitoes, which spirally impact against the net and are then killed and collected in a collector secured on a lower portion of the net, thereby catching mosquitoes in a safer and more efficient way.

15 Claims, 5 Drawing Sheets

CANTILEVER TYPE MOSQUITO CATCHER

BACKGROUND OF THE INVENTION

A conventional mosquito-killing lamp includes a fluorescent lamp having a net conducted with a high tension or high frequency current disposed around the fluorescent lamp for killing mosquitoes flying towards the lamp by electric shock caused on the net. Even the electric current may be designed to be low ampere, which is still dangerous and hazardous, especially for a kid or baby.

Meanwhile, the net surrounding a central fluorescent lamp may reduce the illumination of the lamp, thereby reducing its mosquito attracting and killing efficiency.

The present inventor has found the drawbacks of a conventional mosquito catcher and invented the present cantilever type mosquito catcher.

SUMMARY OF THE INVENTION

The object of the present invention is to provide a mosquito catcher including at least a fluorescent lamp installed on a cantilever secured above a fan impeller, a mosquito-attracting agent placed on the catcher for luring the mosquito flying to the lamp so as to suck the mosquitoes by the fan impeller into a cone-shaped net secured under the fan impeller for killing the mosquitoes, which spirally impact against the net and are then killed and collected in a collector secured on a lower portion of the net, thereby catching mosquitoes in a safer and more efficient way.

DETAILED DESCRIPTION

Figure 1:
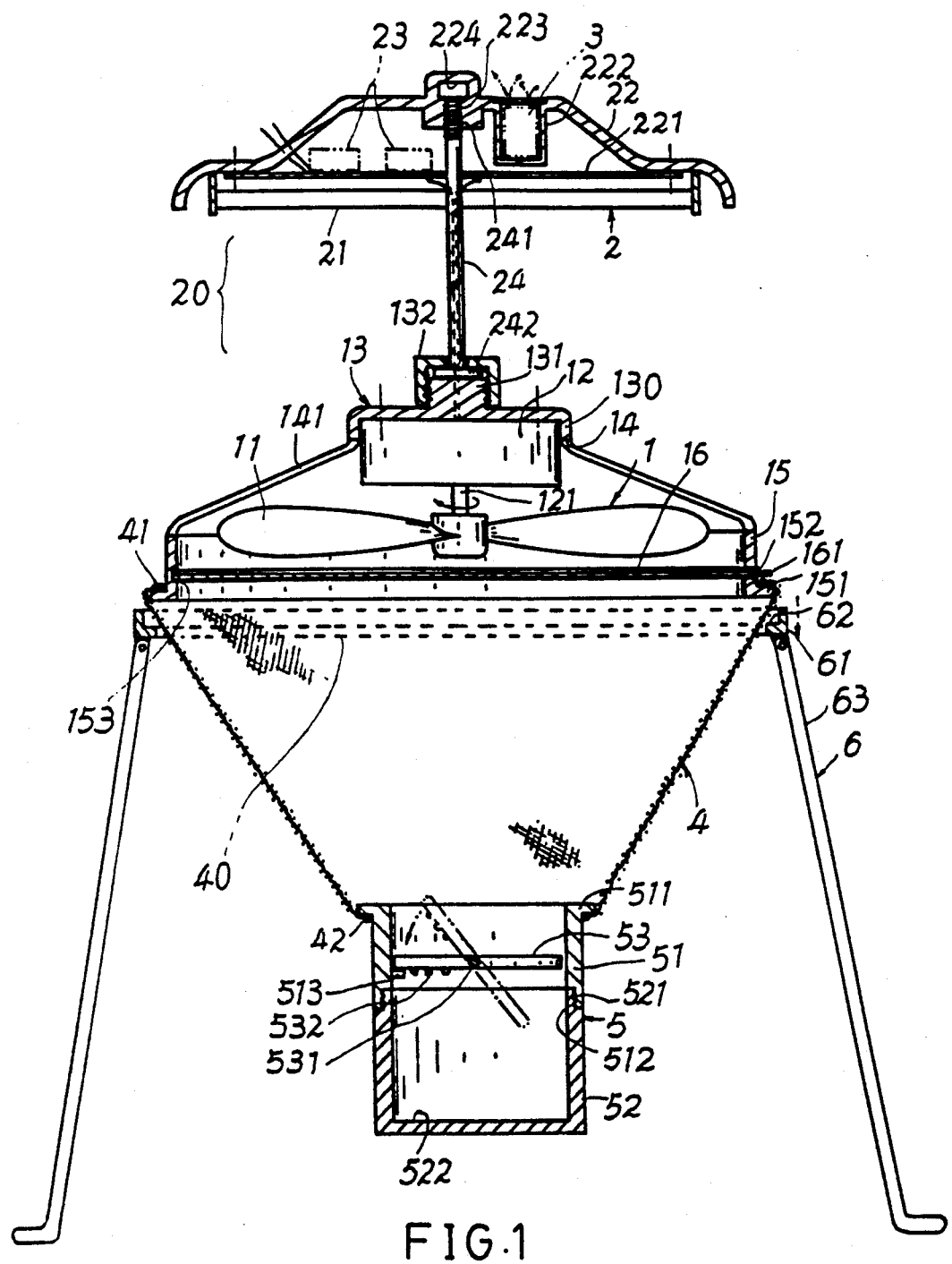
FIG. 1 is an elevational view of the present invention.

As shown in FIG. 1, the present invention comprises: a fan means 1, a lamp means 2, a mosquito-attracting agent 3, a net 4, a collecting means 5, and a mounting frame 6.

The fan means 1 includes: a fan impeller 11 rotatably secured to a motor shaft of a driving motor 12 encased in a hood 13, a plurality of suction ports 14 notched in the hood 13 to form a plurality of ribs 141 radially disposed on the hood 13, a short cylindrical portion 15 secured with the hood 13 having a flange 151 circumferentially extending horizontally from a lower periphery of the cylindrical portion 15, and a blind 16 having a handle portion 161 embedded in a blind groove 153 annularly formed inside a lower portion of the cylindrical portion 15 through a semi-circular slot 152 cut in a side wall of the cylindrical portion 15 for detachably inserting the blind 16 through the slot 152.

Figure 2:
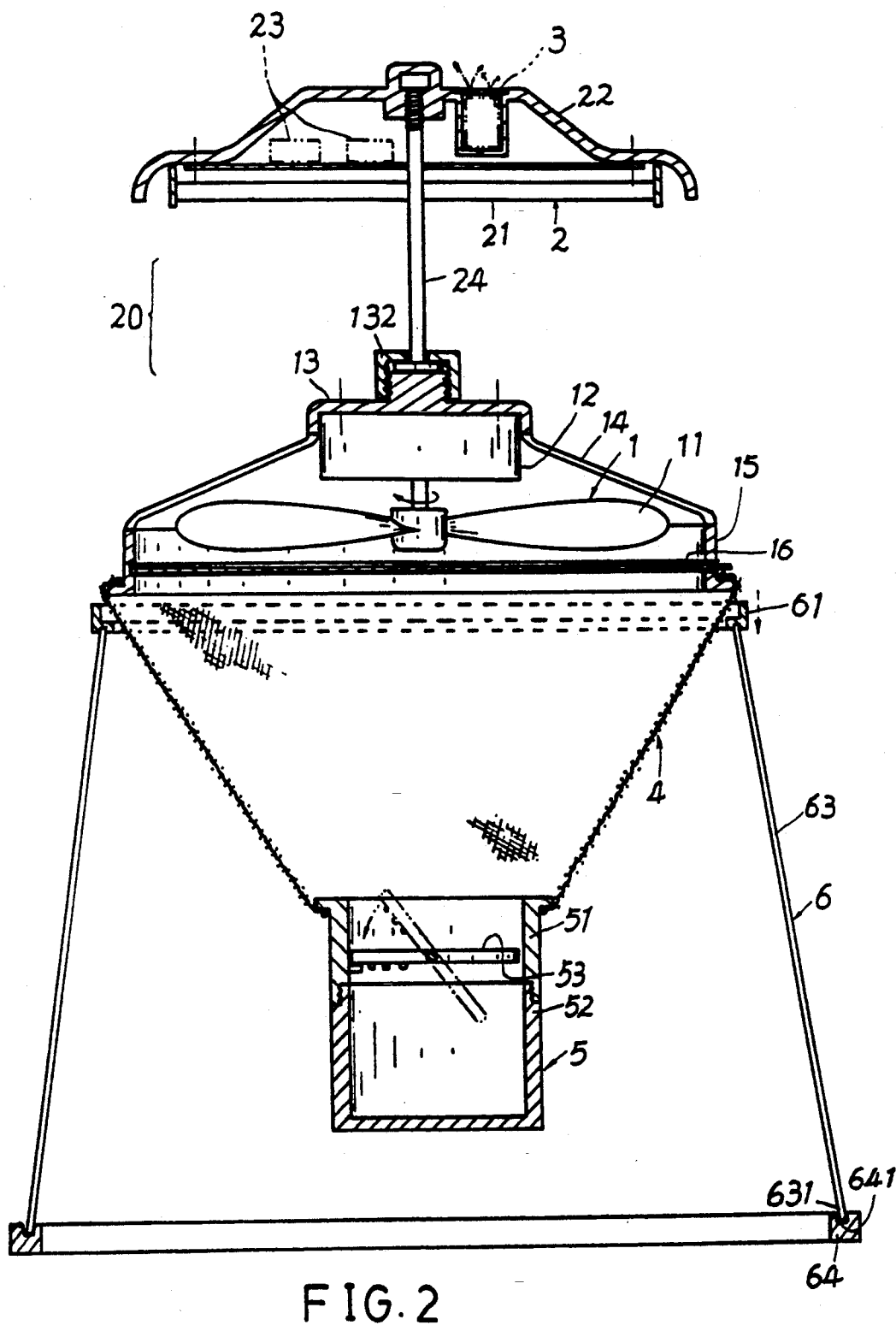
FIG. 2 shows a mosquito catcher of FIG. 1 mounted on a base holder.

The hood 13 includes a motor socket 130 for fixing the driving motor 12 in the socket 130, a male-threaded stem 131 protruding upwardly from a central portion of the hood 13, and a female-threaded cap 132 engageable with the male-threaded stem 131 for firmly fastening a bottom disk 242 of a cantilever 24 of the lamp means 2 in between the cap 132 and the stem 131 for vertically erecting the cantilever 24 and the lamp means 2 above the fan means 1 as shown in the FIGS. 1, 2.

The lamp means 2 includes: at least two straight fluorescent lamps 21 or a round fluorescent lamp secured in a lamp shade 22 secured on an upper end portion of the cantilever 24 defining a void portion 20 between the lamps 21 and the fan means 1, and a power supply means 23 secured on a mounting plate 221 formed in the shade 22 including a transformer, a starter, and other switch means of a power source.

The shade 22 further includes an agent container 222 recessed in the shade for filling mosquito-attracting agent, chemical, vaporizable liquid and blood-containing liquid in the agent container 222 for luring mosquitoes flying towards the lamp 21, a female-threaded hole 223 engaged with an upper male-threaded end portion 241 of the cantilever 24, and a hanging hole 224 formed on a top portion of the shade 22 to be hanged on a wall.

The net 4 is formed as a cone shape tapered downwardly having an upper periphery 41 sandwiched in between the flange 151 of the fan means 1 and the mounting frame 6, and a lower periphery 42 secured with the collecting means 5. The meshes of the net 4 should be generally smaller than an average size of a mosquito. The net 4 may be reinforced by a plurality of radial ribs (not shown) radially formed on the net 4.

The net 4 may be a plastic, or a metallic net or screen, or may be a metallic conical plate having a plurality of perforations drilled in the conical plate.

The collecting means 5 includes: an upper cylindrical portion 51 having an upper extension 511 secured with a lower periphery 42 of the net 4, a lower container 52 secured on a lower portion of the upper cylindrical portion 51, and a drain valve 53 formed at an inlet port of the upper cylindrical portion 51 to be operatively opened to discharge killed mosquitoes from the net 4 into the lower container 52 for disposal use.

The upper cylindrical poriton 51 is formed with a female-threaded portion 512 on a lowest portion of the cylindrical portion 51 engageable with a male-threaded portion 521 formed on an upper portion of the lower container 52. At least an intermediate coupling cylinder (not shown) having an upper male-threaded end portion engageable with the female-threaded portion 512 of the upper cylindrical portion 51 and having a lower female-threaded end portion engageable with the male-threaded portion 521 of the lower container 52, thereby extending a total height of the collecting means 5 by incorporating at least an intermediate coupling cylinder between the upper cylindrical portion 51 and the lower container 52 for increasing a load capacity of mosquitoes into the collecting means 5.

The drain valve 53 may be formed as a circular blade pivotally secured in an upper portion of the collecting means 5 by a pivot 531, having a counter weight 532 fixed on a semicircle portion of the circular blade so as to always gravitationally bias the blade to seat on a stopper 513 formed on an inside wall of the upper cylindrical portion 51 to close the blade as shown in solid in FIG. 1.

The mounting frame 6 includes: an upper retainer ring 61, an annular recess 62 annularly recessed in the retainer ring 61 to be engaged with the flange 151 of the fan means 1 for sandwiching the upper periphery 41 of the net 4 in between the ring 61 and the flange 151 of the fan means 1, and a plurality of supporting leg members 63 pivotally secured to the retainer ring 61 to be extendibly supported on a surface such as on a ground or table surface.

As shown in FIG. 2, each supporting leg member 63 has a lowest end portion 631 inserted in a leg hole 641 formed in a base holder 64 which may be a hollow plate or a ring standing on a floor surface.

Figure 3:
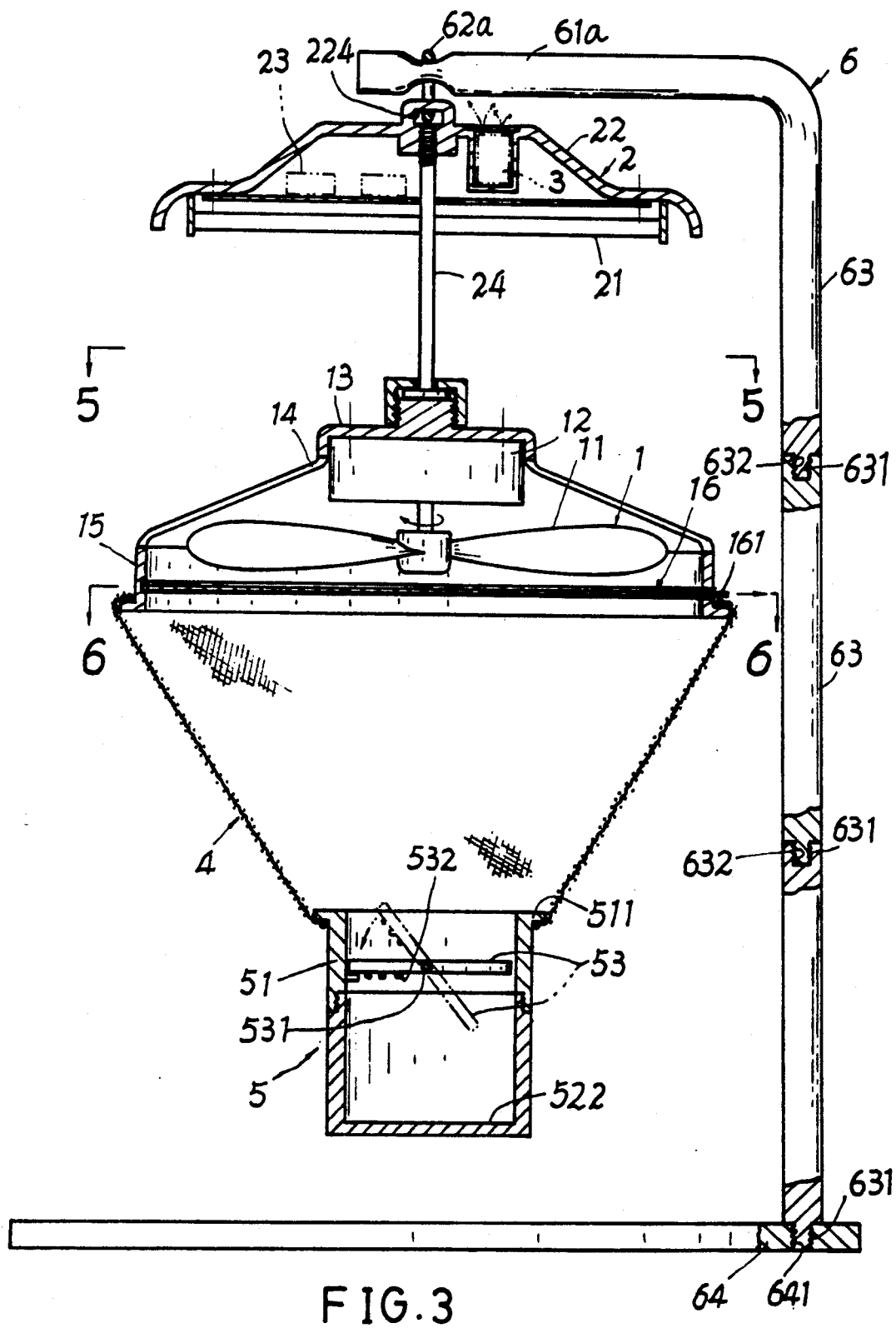
FIG. 3 shows a mosquito catcher of the present invention hanged on a frame.

As shown in FIG. 3, the mounting frame 6 includes: a supporting column 63 vertically secured on a base holder 64, a horizontal beam 61a perpendicularly secured to an upper end portion of the supporting column 63 for hanging the shade 22 of the lamp means 2 under the horizontal beam 61a.

The horizontal beam 61a has an outer end portion secured with a hanger 62a for engaging a hanger hole 224 formed on the shade 22 for hanging the lamp means 2, the fan means 1, the net 4 and the collecting means 5 on the mounting frame 6.

The supporting column 63 may be formed as a collapsible column which can be dismantled or broken down for convenient storage and handling purpose. For instance, a column section is formed with a lower screen portion 631 engageable with a screw hole 632 formed in an upper portion of another column section positioned under the upper column section so as to assemble an integrated supporting column 63 of this invention.

Figure 4:
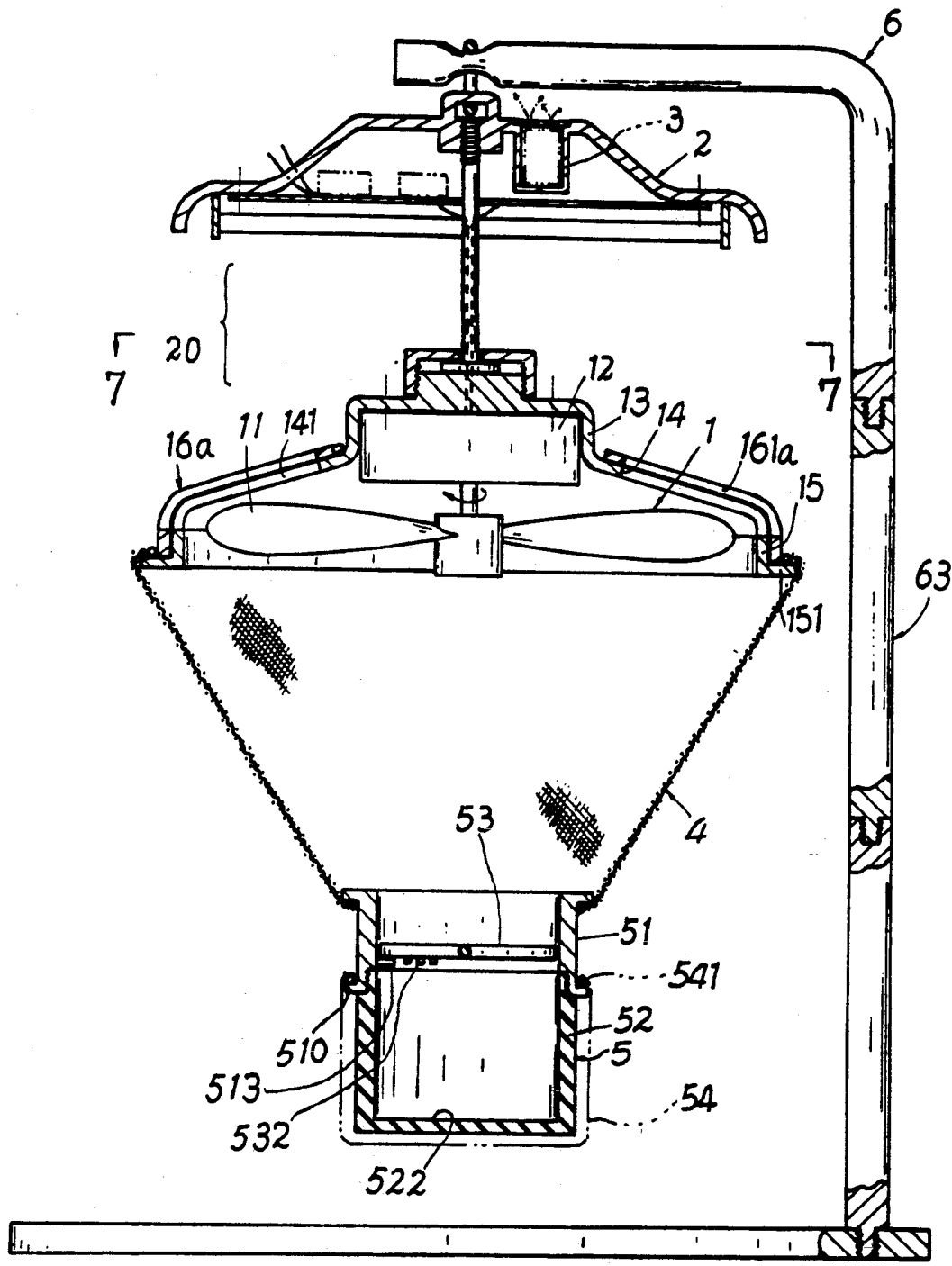
FIG. 4 shows another preferred embodiment of the present invention.
Figure 7:
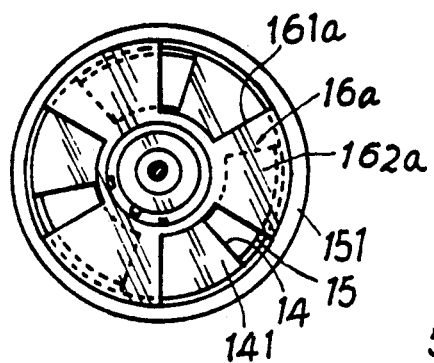
FIG. 7 is a top view of the present invention when viewed from, 7—7 direction of FIG. 4.

As shown in FIG. 4, the lower container 53 may be dismantled from the upper cylindrical portion 51 to be replaced with a collection bag 54 having an upper bag opening 541 to be tied around a lower flange 510 formed on a lower portion of the upper cylindrical portion 51 of the collecting means 5.

As shown in FIG. 4, 7, the aforesaid blind 16 may be modified to be a shallow conical shielding plate 16a slidably engageable with the hood 13 also with shallow conical shape, having a plurality of suction opening 161a cut in the shielding plate 16a operatively matching with the suction ports 14 cut in the hood 13 and having a plurality of sector-shaped plate portions 162a, each plate portion 162a juxtapositional to each suction opening 161a and rotatably shielding each the suction port 14 of the hood 13 when switching off the driving motor 12 to prevent escape of caught mosquitoes in the net 4.

When using the present invention, the lamp 21 is lit and the fan impeller 11 is rotated, the mosquitoes may be lured by the light of the lamp 21 and by the odor from the agent 3 to fly toward the lamp location and void portion 20 to be drafted and sucked into the net 4 by the rotating impeller 11 to impact against the net 4. The dead mosquitoes will then be discharged into the container 52 of the collecting means 5 for disposal.

The present invention is superior to a conventional mosquito catcher with the following advantages:
1. The lamp 2 is suspended above the fan 1 by the cantilever 24 to form a greater void space 20 without obstructing the incoming mosquitoes, thereby increasing its catching efficiency.
2. The net 4 is formed as a cone shape tapered downwardly causing a spiral or eddy air flow driven by the fan means 1 to forceably impacting the incoming mosquitoes against the net 4 for efficiently killing the mosquitoes.
3. There is not provided with any high tension of electric power, thereby preventing electric shock accident hazardous to a baby.
4. The structure of this invention is so simple to decrease its production cost. The lamp 2 can be easily manually separated from the fan 1 for maintenance or cleaning purpose.

Figure 8:
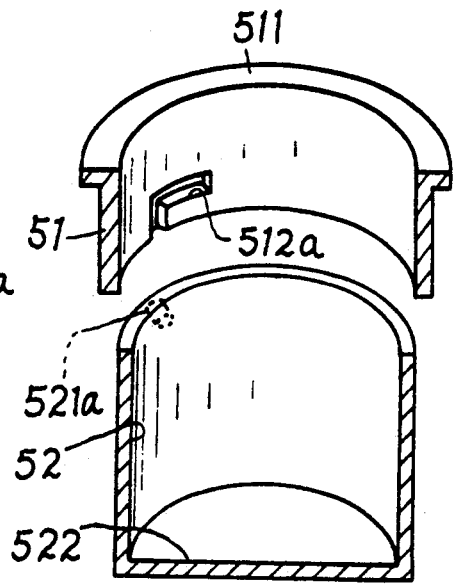
FIG. 8 shows another preferred embodiment of a collecting means of the present invention.
Figure 5:
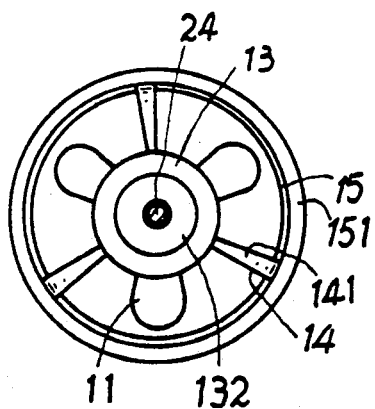
FIG. 5 is a top view drawing of the present invention when viewed from 5—5 direction of FIG. 3.
Figure 6:
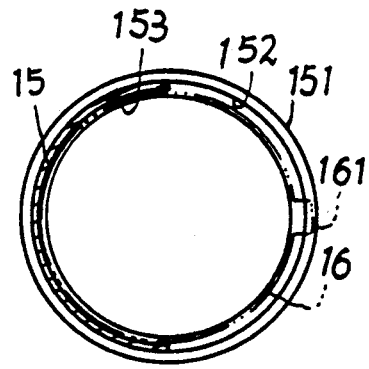
FIG. 6 is a cross sectional drawing when viewed from 6—6 direction of FIG. 3.

For decorative purpose, an art or mini lamp may be further provided under the shade 22. As shown in FIG. 8, the upper cylindrical poriton 51 of the collecting means 5 may be formed with plural sockets 512a in its lower portion to be engageable with plural tenons 521a formed on an upper portion of the lower container 52 for replacing the aforementioned threaded portions 512, 521 for assembling or disassembling of the two elements 51, 52.

I claim:
1. A mosquito catcher comprising:
a fan means having a fan impeller driven by a driving motor encased in a hood mounted on a mounting frame placed on a surface;
a lamp means having at least a fluorescent lamp secured in a shade fixed on a cantilever vertically secured above said fan means defining a void portion between said lamp and said fan means;
a mosquito-attracting agent distributed on said shade near said lamp for attracting mosquitoes flying towards the lamp to be sucked downwardly by said fan impeller;
a net generally formed as a cone shape tapered downwardly from said fan means for spirally impacting the incoming mosquitoes sucked into the net by said fan means; and
a collecting means secured on a lower portion of said net for collecting dead mosquitoes dropping from said net;
said fan means including: said fan impeller rotatably secured to a motor shaft of said driving motor encased in said hood, a plurality of suction ports notched in the hood to form a plurality of ribs radially disposed on the hood, a short cylindrical portion with a shallow conical shape secured with the hood having a flange circumferentially extending horizontally from a lower periphery of the cylindrical portion, and a blind having a handle portion embedded in a blind groove annularly formed inside a lower portion of the short cylindrical portion through a semi-circular slot cut in a side wall of the cylindrical portion for detachably inserting the blind through the slot;
said hood including a motor socket for fixing the driving motor in the socket, a male-threaded stem protruding upwardly from a central portion of the hood, and a female-threaded cap engageable with the male-threaded stem for firmly fastening a bottom disk of a cantilever of the lamp means in between the cap and the stem for vertically erecting the cantilever and the lamp means above

2. A mosquito catcher according to claim 1, wherein said shade includes an agent container recessed in the shade for filling an agent selected from a mosquito-attracting agent, chemical. vaporizable liquid and blood-containing liquid in the agent container for luring mosquitoes flying towards the lamp, a female-threaded hole engaged with an upper male-threaded end portion of the cantilever, and a hanging hole formed on a top portion of the shade to be hanged on a wall.

3. A mosquito catcher according to claim 1, wherein said net is formed as a cone shape tapered downwardly having an upper periphery sandwiched in between said flange formed on a lower portion of the fan means and the mounting frame, and a lower periphery secured with the collecting means, the net having meshes generally smaller than an average size of a mosquito.

4. A mosquito catcher according to claim 3, wherein said net is a plastic, a metallic net, or a metallic conical plate having a plurality of perforations drilled in the conical plate.

5. A mosquito catcher according to claim 1, wherein said collecting means includes: an upper cylindrical portion having an upper extension secured with a lower periphery of the net, a lower container secured on a lower portion of the upper cylindrical portion, and a drain valve formed at an inlet port of the upper cylindrical portion to be operatively opened to discharged killed mosquitoes from the net into the lower container for disposal use.

6. A mosquito catcher according to claim 5, wherein said upper cylindrical portion is formed with a female-threaded portion on a lowest portion of the cylindrical portion engageable with a male-threaded portion formed on an upper portion of the lower container.

7. A mosquito catcher according to claim 6, wherein at least an intermediate coupling cylinder having an upper male-threaded end portion engageable with the female-threaded portion of the upper cylindrical portion and having a lower female-threaded end portion engageable with the male-threaded portion of the lower container is provided for extending a total height of the collecting means by incorporating at least one said intermediate coupling cylinder between the upper cylindrical portion and the lower container for increasing a load capacity of mosquitoes into the collecting means.

8. A mosquito catcher according to claim 5, wherein said drain valve is formed as a circular blade pivotally secured in an upper portion of the collectng means by a pivot, having a counter weight fixed on a semicircle portion of the circular blade about one half of the circular blade so as to always gravitationally bias the blade to seat on a stopper formed on an inside wall of the upper cylindrical portion to close the blade.

9. A mosquito catcher according to claim 5, wherein said lower container is dismantled from the upper cylindrical portion to be replaced with a collection bag having an upper bag opening to be tied around a lower flange formed on a lower portion of the upper cylindrical portion of the collecting means.

10. A mosquito catcher according to claim 1, wherein said mounting frame includes: an upper retainer ring, an annular recess annularly recessed in the retainer ring to be engaged with a lower flange of the fan means for sandwiching an upper periphery of the net in between the ring and the flange of the fan means, and a plurality of supporting leg members pivotally secured to the retainer ring to be extendibly supporting on a surface.

11. A mosquito catcher according to claim 10, wherein each said supporting leg member has a lowest end portion inserted in a leg hole formed in a base holder formed as a hollow plate or a ring standing on a floor surface.

12. A mosquito catcher comprising:
a fan means having a fan impeller driven by a driving motor encased in a hood having a blind for shielding a plurality of suctions ports formed in said hood;
a lamp means having at least a fluorescent lamp secured in a shade fixed on a cantilever vertically secured to and positioned above said fan means defining a void portion between said lamp and said fan means;
a mosquito-attracting agent distributed on said shade near said lamp for attracting mosquitoes flying towards the lamp to be sucked downwardly by said fan impeller;
a net generally formed as a cone shape tapered downwardly from said fan means for spirally impacting the incoming mosquitoes sucked into the net by said fan means; and
a collecting means secured on a lower portion of said net for collecting dead mosquitoes dropping from said net; and
a mounting frame standing on a surface for hanging said lamp means, said fan means, said net and said collecting means.

13. A mosquito catcher according to claim 12, wherein said mounting frame includes: a supporting column vertically secured on a base holder, a horizontal beam perpendicularly secured to an upper end portion of the supporting column for hanging the shade of the lamp means under the horizontal beam, said horizontal beam having an outer end portion secured with a hanger for engaging a hanger hole formed on the shade for hanging the lamp means, the fan means, the net and the collecting means on the mounting frame.

14. A mosquito catcher according to claim 13, wherein said supporting column is comprised of a plurality of column sections which can be dismantled or broken down for convenient storage and handling purpose, having an upper column section formed with a lower screw portion engageable with a screw hole formed in an upper portion of another lower column section positioned under the upper column section so as to assemble said supporting column.

15. A mosquito catcher according to claim 12, wherein said blind is a shallow conical shielding plate slidably engageable with the hood with shallow conical shape, having a plurality of suction openings cut in the shielding plate operatively matching with the suction ports cut in the hood and having a plurality of sector-shaped plate portions, each plate portion juxtapositional to each suction opening and rotatably shielding each the suction port of the hood when switching off the driving motor to prevent escape of caught mosquito from the net.

* * * * *